(12) United States Patent  (10) Patent No.: US 8,775,386 B2
Asakura et al.  (45) Date of Patent:  Jul. 8, 2014

(54) DEVICE AND METHOD FOR GENERATING COPY OF DATABASE

(75) Inventors: Keisuke Asakura, Tokyo (JP); Ritsuko Boh, Chiba (JP); Noriaki Kohno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 12/858,637

(22) Filed: Aug. 18, 2010

(65) Prior Publication Data

US 2011/0093440 A1  Apr. 21, 2011

(30) Foreign Application Priority Data

Oct. 19, 2009 (JP) .................................. 2009-240534

(51) Int. Cl.
*G06F 17/00* (2006.01)
(52) U.S. Cl.
USPC ........... 707/682; 707/640; 707/661; 707/674; 711/161; 714/2
(58) Field of Classification Search
USPC ................ 707/640, 661, 674; 711/161; 714/2
See application file for complete search history.

(56) References Cited

U.S. PATENT DOCUMENTS

| 5,381,545 | A | * | 1/1995 | Baker et al. ...................... 714/19 |
| 5,870,537 | A | * | 2/1999 | Kern et al. .................... 714/6.23 |
| 6,065,018 | A | | 5/2000 | Beier et al. |
| 6,289,357 | B1 | * | 9/2001 | Parker ........................... 707/610 |
| 6,732,123 | B1 | * | 5/2004 | Moore et al. ........................... 1/1 |
| 6,957,221 | B1 | * | 10/2005 | Hart et al. .............................. 1/1 |
| 6,983,295 | B1 | * | 1/2006 | Hart ................................ 707/610 |
| 7,017,003 | B2 | * | 3/2006 | Murotani et al. ............. 711/100 |
| 7,133,884 | B1 | * | 11/2006 | Murley et al. ......................... 1/1 |
| 7,200,626 | B1 | | 4/2007 | Hoang et al. |
| 7,461,103 | B2 | * | 12/2008 | Aronoff et al. ........................ 1/1 |
| 7,555,502 | B2 | * | 6/2009 | Chandrasekaran ................... 1/1 |

(Continued)

FOREIGN PATENT DOCUMENTS

JP  09-097201  4/1997
JP  2001-344139  12/2001

(Continued)

OTHER PUBLICATIONS

Takako Kunitada, Information Materials for IDS, JPO Office Action Dated Jul. 19, 2011, 2 pages.

(Continued)

*Primary Examiner* — Hung Le
(74) *Attorney, Agent, or Firm* — Andrea Bauer; Hoffman Warnick LLC

(57) ABSTRACT

In a DBMS, in response to a request from application programs, a base table update function updates a base table and a recovery start point, and a log recording function records update logs for the base table. Then, at predetermined timing, a backup function outputs the content of the base table to a backup file and copies the recovery start point associated with the base table to a recovery start point. Subsequently, when a user has specified a quiesce point and the base table, a copy generation function generates a target table that is a copy of the base table at the quiesce point by updating the backup file of the specified base table with ones of the update logs from the recovery start point to the quiesce point.

6 Claims, 10 Drawing Sheets

(56) References Cited

U.S. PATENT DOCUMENTS

| | | | |
|---|---|---|---|
| 7,769,718 B2* | 8/2010 | Murley et al. | 707/649 |
| 7,788,521 B1* | 8/2010 | Sim-Tang | 714/4.12 |
| 7,991,749 B2* | 8/2011 | Nishikawa et al. | 707/682 |
| 8,010,496 B2 | 8/2011 | Okada et al. | |
| 8,341,014 B2* | 12/2012 | Bobak et al. | 705/7.12 |
| 2004/0260726 A1* | 12/2004 | Hrle et al. | 707/104.1 |
| 2006/0212493 A1* | 9/2006 | Aronoff et al. | 707/202 |
| 2006/0218204 A1* | 9/2006 | Ofer et al. | 707/201 |
| 2006/0218206 A1* | 9/2006 | Bourbonnais et al. | 707/202 |
| 2007/0022146 A1* | 1/2007 | Murley et al. | 707/204 |
| 2007/0185922 A1* | 8/2007 | Kapoor et al. | 707/202 |
| 2007/0185923 A1* | 8/2007 | Nishikawa et al. | 707/202 |
| 2008/0154914 A1* | 6/2008 | Kan et al. | 707/10 |
| 2008/0281865 A1* | 11/2008 | Price et al. | 707/103 Y |
| 2009/0125568 A1* | 5/2009 | Nishikawa et al. | 707/202 |
| 2009/0171707 A1* | 7/2009 | Bobak et al. | 705/7 |
| 2009/0300078 A1* | 12/2009 | Boyd et al. | 707/204 |
| 2009/0300284 A1* | 12/2009 | Murotani et al. | 711/114 |
| 2010/0094800 A1* | 4/2010 | Sharp | 706/55 |
| 2010/0145909 A1* | 6/2010 | Ngo | 707/611 |

FOREIGN PATENT DOCUMENTS

| | | |
|---|---|---|
| JP | 2004078464 A | 3/2004 |
| JP | 2005-242729 | 9/2005 |
| JP | 2006155676 A | 6/2006 |
| JP | 2009-146228 | 7/2009 |
| JP | 2009151636 A | 7/2009 |

OTHER PUBLICATIONS

Le, U.S. Appl. No. 13/611,056, Office Action 1 dated Oct. 24, 2013, JP920090062US2, 19 pages.

Le, U.S. Appl. No. 13/611,056, Office Action 1 dated Feb. 25, 2014, 11 pages.

Le, U.S. Appl. No. 13/611,056, Notice of Allowance and Fees Due, dated Mar. 25, 2014, 14 pages.

* cited by examiner

FIG. 4 t1: TRANSACTION1 BASE TABLE30a R3 300→350
t2: TRANSACTION1 BASE TABLE30b R1 xx→yy
t3: TRANSACTION2 BASE TABLE30c R9 mm→nn
t4: TRANSACTION1 BASE TABLE30a R5 500→450
t5: TRANSACTION1 commit
t6: TRANSACTION2 BASE TABLE30a R6 600→650
t7: TRANSACTION2 commit
t8: TRANSACTION3 BASE TABLE30a R2 200→250
t9: TRANSACTION3 BASE TABLE30b R8 qq→bb
t10: TRANSACTION3 commit
t11: TRANSACTION4 BASE TABLE30a R3 350→200
t12: TRANSACTION5 BASE TABLE30a R6 650→700
t13: TRANSACTION4 commit
t14: TRANSACTION5 BASE TABLE30a R2 250→300
t15: TRANSACTION5 commit

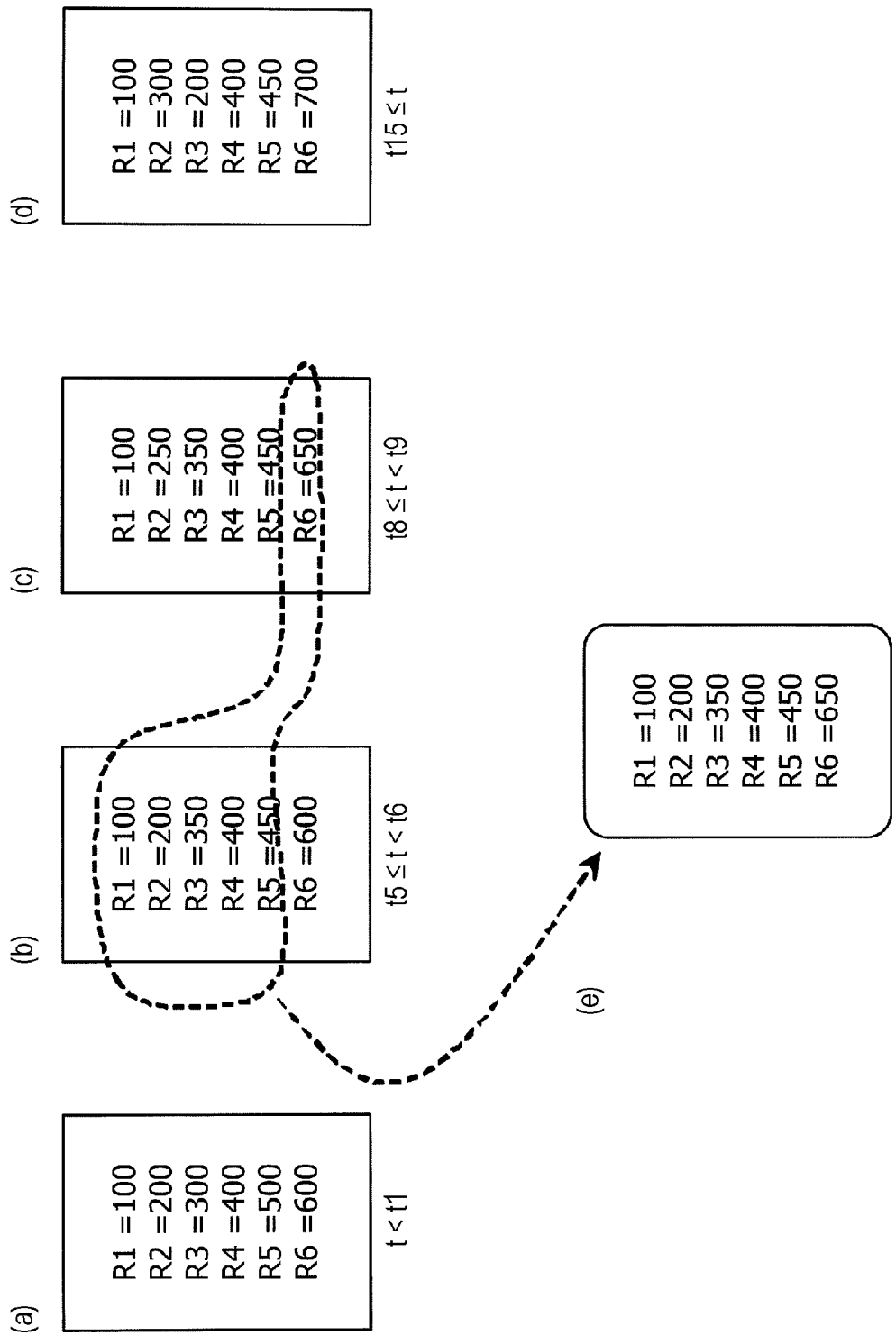

FIG. 6 t1: TRANSACTION1 BASE TABLE30a R3 300→350 ··(1)
t4: TRANSACTION1 BASE TABLE30a R5 500→450 ··(2)
t5: TRANSACTION1 commit
t6: TRANSACTION2 BASE TABLE30a R6 600→650 ··(3)
t7: TRANSACTION2 commit
t8: TRANSACTION3 BASE TABLE30a R2 200→250 ··(4)
t10: TRANSACTION3 commit
t11: TRANSACTION4 BASE TABLE30a R3 350→200 ··(5)
t12: TRANSACTION5 BASE TABLE30a R6 650→700 ··(6)
t13: TRANSACTION4 commit

DEVICE AND METHOD FOR GENERATING COPY OF DATABASE

TECHNICAL FIELD

The present invention relates to devices and methods for generating copies of databases, and in particular, relates to a device and a method for generating a copy of a database at a specific point in time.

RELATED ART

Recently, the number of computer systems continuously providing services 24 hours a day, every day of the year, has increased. In such computer systems, databases are continuously updated. However, even in the case of a database that is continuously updated, when the database is used as, for example, input data for batch processing or a Data Warehouse, it is required to make copies of the database at a specific quiesce point.

For example, a case where the content of a database at 00:00:00 is requested will now be considered. The database is continuously updated.

In this case, when it is ensured that only insertion of a row into a table in the database is performed, the content of the database at 00:00:00 can be read because an arrangement can be adopted in which each row is set to include a time stamp column holding insertion time, and a row satisfying a condition that the insertion time is before 00:00:00 is read.

However, when updating of a row in a table in the database is performed, this method cannot be used. This is because, even in a case where each row is set to include a time stamp holding update time, the time stamp does not always remain intact when copying is performed. For example, it is assumed that a row A was updated at 23:59:00 and 00:00:10. In this case, a time stamp held by the row A indicates 00:00:10. Thus, when a row satisfying a condition that the update time is before 00:00:00 is searched for at several minutes past 00:00:00, the row A falls outside the search results. As the result, the data of the row A at 23:59:00 is lost, and the consistent content of the database at 00:00:00 cannot be acquired. In this way, it is difficult to create the content of a database at a specific quiesce point, the database being continuously updated, using the current functions.

Similarly, in a case where a row in a database is deleted, a row having originally existed may be lost when the content of the database at a quiesce point is acquired.

Some Japanese Unexamined Patent Application Publications disclose techniques for acquiring the content of a database at a specific point in time.

In Japanese Unexamined Patent Application Publication No. 2001-344139, a controlling table unit holds the controlling information of each database object and is always updated, and a snapshot information storage unit holds a copy of the controlling table unit at a specific point in time. A backup processing unit compares, at backup time, information stored in the snapshot information storage unit with the current controlling table unit to determine the content of changes (differences) in the database and create and store backup information indicating the content of changes.

In Japanese Unexamined Patent Application Publication No. 2009-146228, upon receiving an instruction to perform backup operations, a backup device assigns, to each point in time indicated by the instruction, a storage area for storing a snapshot created for the point in time. When the original data is updated after the points in time indicated by the instruction, the backup device checks whether the original data corresponding to a place where an update operation has been performed at the immediately preceding point in time indicated by the instruction is stored in a storage area assigned as one for storing the latest snapshot created for the immediately preceding point in time. When the backup device has determined that such original data is not stored in such a storage area, the backup device stores, only in the storage area for storing the latest snapshot, the original data close to be updated, the original data corresponding to the place where an update operation has been performed.

In Japanese Unexamined Patent Application Publication No. 9-97201, a backup creation unit performs an operation of backing up a database and generates a notification of the progress of the backup operation. A database reference and update unit performs operations of referring to and updating a database and outputs addition and update information indicating the content of addition of data to a database or updating of a database. A backup creation status notification unit determines, on the basis of a notification of the progress of backup and addition and update information, whether an addition or update operation has been performed on data having been backed up. When an addition or update operation has been performed on the data having been backed up, an addition and update reflection unit adds data to the backup data or updates the backup data on the basis of the addition and update information.

In Japanese Unexamined Patent Application Publication No. 2005-242729, a system recovery management unit creates a backup of a volume in the initial state and a snapshot of the volume during system operation, using a backup restore processing unit in a storage device, and keeps watch on the conditions using a recovery point. When a system failure has occurred, the system recovery management unit determines a point to be recovered from the recovery point, restores the volume from the created backup, and updates metadata for maintaining the consistency of the data.

SUMMARY OF INVENTION

The techniques disclosed in these and other references are aimed at only an operation of backing up the content of a database at a specific point in time and/or an operation of restoring the content, not aimed at creating a copy of the database at the specific point in time.

Existing approaches for creating a copy of a database at a specific point in time include the following.

The first approach is one in which data is retrieved from a database while a business application is caused to update the database, and then transaction logs (operation logs) recorded by the business application while the data is retrieved are applied to the retrieved data.

The second approach is one in which a copy of a database at a quiesce point is created by updating an alternate table when updating the database and temporarily stopping updating of the alternate table at the quiesce point.

However, these approaches have a problem such that the implementation and system operation are costly. Especially, in the case of a large system holding a database including several thousand tables or a database of several terabytes, the implementation and operation based on such approaches are not practical.

The present invention reduces the cost for generating a copy of a database at a specific point in time.

The present invention provides a device for generating a copy of a database at a specific point in time. The device includes a backup data acquisition unit acquiring backup data of the database output by a database management system (DBMS) for use in recovering the database without stopping updating of the database before the specific point in time, an update log acquisition unit acquiring update logs of the database recorded for use in recovering the database during a period between a recovery start point before the DBMS having output the backup data and the specific point in time, and a generation unit generating, as the copy, a new database holding content of the database at the specific point in time on the basis of the backup data acquired by the backup data acquisition unit and the update logs acquired by the update log acquisition unit.

In this case, the generation unit may generate the new database by updating the backup data acquired by the backup data acquisition unit with update logs, acquired by the update log acquisition unit, relating to transactions committed before the specific point in time.

The generation unit may generate the new database by updating the backup data acquired by the backup data acquisition unit with update logs, acquired by the update log acquisition unit, relating to updates having not been reflected in the backup data.

The device may further include a reception unit accepting specification of the specific point in time by a user.

The device may further include a recovery start point acquisition unit acquiring the recovery start point stored in association with the backup data acquired by the backup data acquisition unit.

Moreover, the present invention provides a device generating a copy of a database at a specific point in time. The device includes a database management system (DBMS) including at least an output function of outputting backup data of the database for use in recovering the database without stopping updating of the database, and a recording function of recording update logs of the database for use in recovering the database, as the copy, a new database holding content of the database at the specific point in time on the basis of the backup data output by the output function of the DBMS before the specific point in time and the update logs recorded by the recording function of the DBMS during a period between a recovery start point before a time period and the specific point in time, the backup data having been output during the time period.

In this case, the device may further include a storage unit storing a checkpoint before the time period, during which the backup data have been output, in association with the backup data output by the output function of the DBMS, and a determination unit determining, as the recovery start point, the checkpoint stored in the storage unit in association with the backup data.

Moreover, the present invention provides a device for generating a copy of a database at a specific point in time. The device includes a database management system (DBMS) including at least an output function of outputting backup data of the database for use in recovering the database without stopping updating of the database, and a recording function of recording update logs of the database for use in recovering the database, a backup data acquisition unit acquiring the backup data output by the output function of the DBMS before the specific point in time, an update log acquisition unit acquiring the update logs recorded by the recording function of the DBMS during a period between a recovery start point before a time period and the specific point in time, the backup data having been output during the time period, and a generation unit generating, as the copy, a new database holding content of the database at the specific point in time by updating the backup data acquired by the backup data acquisition unit with first update logs, out of the update logs acquired by the update log acquisition unit, the first update logs relating to transactions committed before the specific point in time and relating to updates having not been reflected in the backup data.

Moreover, the present invention provides a method for generating a copy of a database at a specific point in time. The method includes acquiring backup data of the database output by a database management system (DBMS) before the specific point in time for use in recovering the database without stopping updating of the database, acquiring update logs of the database recorded for use in recovering the database during a period between a recovery start point before a time period and the specific point in time, the DBMS having output the backup data during the time period for use in recovering the database, and generating, as the copy, a new database holding content of the database at the specific point in time on the basis of the backup data and the update logs.

Moreover, the present invention provides a program for causing a computer to function as a device for generating a copy of a database at a specific point in time. The program causes the computer to function as a backup data acquisition unit acquiring backup data of the database output by a database management system (DBMS) for use in recovering the database without stopping updating of the database before the specific point in time, an update log acquisition unit acquiring update logs of the database recorded for use in recovering the database during a period between a recovery start point before the DBMS having output the backup data and the specific point in time, and a generation unit generating, as the copy, a new database holding content of the database at the specific point in time on the basis of the backup data acquired by the backup data acquisition unit and the update logs acquired by the update log acquisition unit.

According to the present invention, the cost for generating a copy of a database at a specific point in time can be reduced.

BRIEF DESCRIPTION OF DRAWINGS

FIG. 4 is a diagram showing exemplary update logs.

FIG. 5 is a diagram showing states of a base table at points in time.

FIG. 6 is a diagram showing exemplary update logs for a base table to be copied from a recovery start point to a quiesce point.

DETAILED DESCRIPTION

An embodiment of the present invention enables simple creation of a copy of a table at a specific quiesce point, the copy being useful for operations, using backup data and update logs that have hitherto been used only for recovery of a failure of a database.

The outline of this operation will briefly be described below. In this case, the description will be given, assuming that an original table (a base table) in a database is TABLE1, and a table (a target table) in which a copy of the base table is stored is TABLEX.

A database management system (DBMS) first acquires backup data of TABLE1 by performing online backup without stopping updating of TABLE1.

Then, the DBMS creates data of TABLEX, using the backup data and an update log of TABLE1. That is, when a quiesce point has been determined, the backup data of TABLE1 is reflected in TABLEX, and the update log of TABLE1 is applied to restore the data to the condition at the quiesce point. As the result, TABLEX is a table holding data of TABLE1 at the quiesce point and can be used as, for example, input data for batch processing or data warehousing operations.

The embodiment of the present invention will now be described in detail, referring to the attached drawings.

Figure 1:
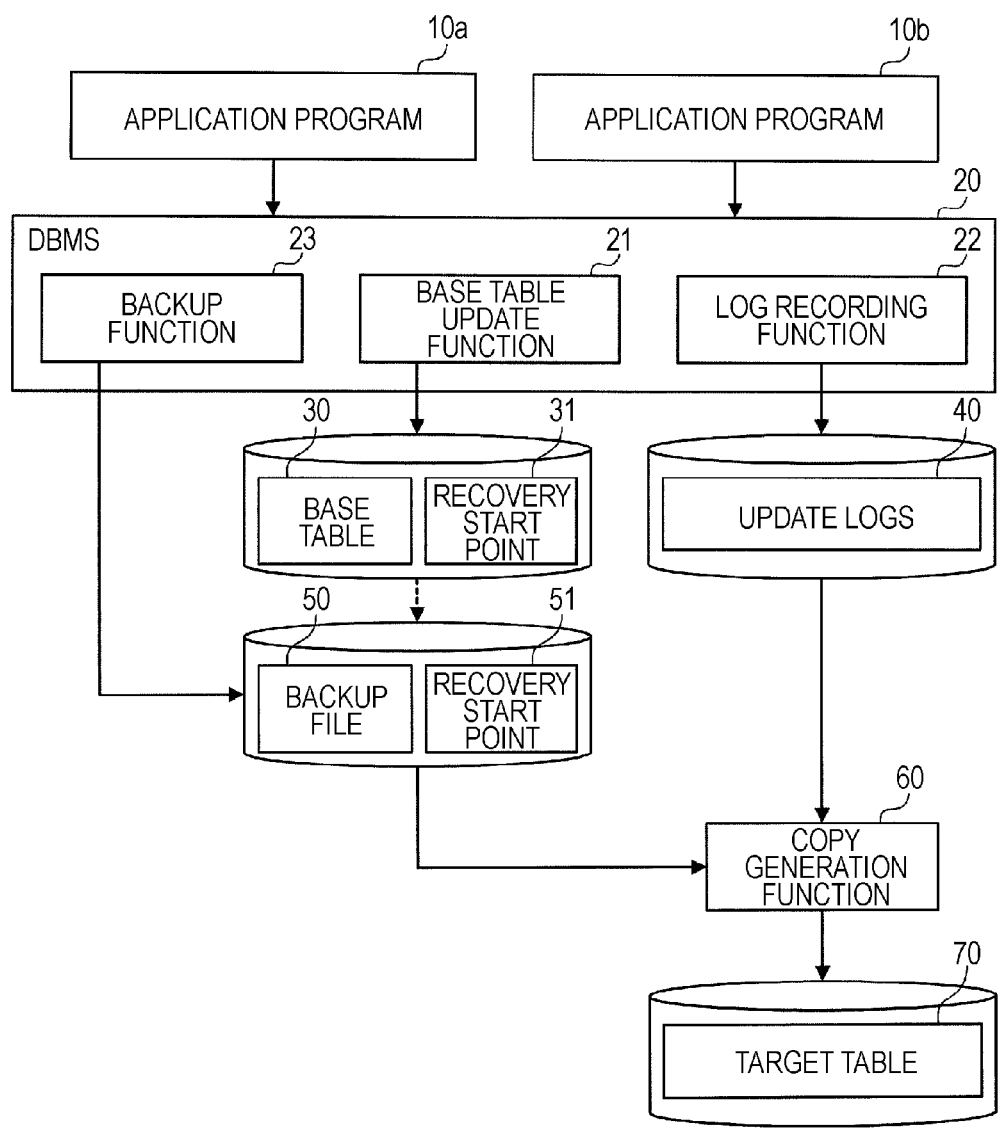
FIG. 1 is a diagram showing exemplary components of a computer to which an embodiment of the present invention is applied.

FIG. 1 is a block diagram showing the components of a computer to which the embodiment is applied.

The computer includes application programs (hereinafter simply called applications) 10a and 10b, a DBMS 20, and a base table 30, as shown in the drawing. The computer further includes update logs 40, a backup file 50, a copy generation function 60, and a target table 70.

The applications 10a and 10b request the DBMS 20 to update the base table 30. Although the applications 10a and 10b are shown in the drawing, when the applications 10a and 10b need not be distinguished from each other, the applications 10a and 10b are denoted as the applications 10. In this case, although only the two applications 10 are shown, three or more applications 10 may exist.

The DBMS 20 is a program for managing a database including the base table 30. The DBMS 20 according to the embodiment operates while updating, to the update logs 40, update data applied to the base table 30 and outputs, to the backup file 50, the content of the base table 30 in response to a request from an operator. The DBMS 20 includes a base table update function 21, a log recording function 22, and a backup function 23.

The base table update function 21 updates the base table 30 when updating of the base table 30 has been requested by the applications 10. The base table update function 21 further updates a recovery start point 31 (information indicating the location of one of the update logs 40 to be used for recovery) associated with the base table 30 when the consistency of the database is ensured.

The log recording function 22 writes, to the update logs 40, update data necessary to, for example, cancel or re-execute updating of the base table 30 and writes, to the update logs 40, commit information indicating that a commit has been performed at commit time. In an embodiment, the log recording function 22 is provided as an exemplary recording function of recording an update log.

The backup function 23 acquires a backup of the base table 30 and outputs the backup to the backup file 50 even while the base table 30 is being updated by the applications 10. This operation can be performed by, for example, temporarily storing data of the base table 30 and the recovery start point 31 in a buffer pool (not shown) in the DBMS 20 and reading the data in the buffer pool. Alternatively, this operation may be performed by backing up the base table 30 and the recovery start point 31 as a physical disk file instead of reading the data in the buffer pool. In this case, this backup operation needs to be performed before a target quiesce point (a quiesce point that may be specified by a user). At this time, although the backup operation may be performed at time just before the target quiesce point or time after a predetermined interval from the target quiesce point at will, the time necessary to create a copy of the base table 30 is reduced by performing the backup operation at a time near the target quiesce point. Moreover, when the content of the plurality of base tables 30 at a quiesce point is necessary, the time at which an online backup operation is performed can be set for each of the base tables 30 at will. That is, there is no limitation such that, for example, respective backups of the plurality of base tables 30 need to be acquired at the same time. In an embodiment, the backup function 23 is provided as an exemplary output function of outputting backup data.

In the description, the DBMS 20 will be described as a program, as described above. Alternatively, the DBMS 20 may be viewed as a function of a computer system implemented by executing a program.

It is assumed that the base table 30 is a table to be updated by the applications 10 and is always updated. In this case, this component is simply called the base table 30. Alternatively, the component may be viewed as storage means for storing the base table 30. Moreover, the recovery start point 31 is stored in association with the base table 30.

The update logs 40 hold update data necessary to, for example, rollback or re-execute updating of the base table 30. Each log record in the update logs 40 holds log location information indicating the location of the log record in the update logs 40, for example, a relative byte address (RBA) or a time stamp, and update location information indicating the location of an updated record corresponding to the log record in the base table 30. In this case, this component is simply called the update logs 40. Alternatively, the component may be viewed as storage means for storing the update logs 40.

The backup file 50 is a file to which a backup of the base table 30 is output. In this case, this component is simply called the backup file 50. Alternatively, the component may be viewed as storage means for storing the backup file 50. Moreover, a recovery start point 51 is stored in association with the backup file 50. The recovery start point 51 is a copy of the recovery start point 31 stored in association with the base table 30, the copy being copied when the base table 30 is backed up. In this case, since the backup file 50 is created while the base table 30 is being updated by the applications 10, update data is not necessarily reflected in the backup file 50. However, all update data can be reflected in the backup file 50 by applying the update logs 40 to the backup file 50, with the recovery start point 51 being the start point. In the embodiment, the backup file 50 is provided as exemplary backup data and an exemplary storage unit storing a checkpoint in association with backup data.

A user specifies the base table 30, which needs to be copied, and a quiesce point to cause the copy generation function 60 to function. Specifically, the copy generation function 60 reads the backup file 50 of the base table 30 and restores the backup file 50 into the target table 70. The copy generation function 60 further reads the recovery start point 51 associated with the backup file 50 and reads the update logs 40, with the recovery start point 51 being the start point. Then, the copy generation function 60 reads a log of the specified base table 30 from the update logs 40 and applies the log to the target table 70. At this time, log location information and update location information in the update logs 40 are used. Since the target table 70, into which the backup file 50 of the base table 30 is restored, has the same physical structure as the base table 30, these pieces of information can be used. When such a log is applied, a time stamp in commit information corresponding to the log is compared with a quiesce point. For example, regarding a transaction that is not committed at a quiesce point, update data is rolled back. Alternatively, after update data up to a quiesce point is reflected, a rollback operation may be performed. As the result, only the update data committed at the quiesce point is reflected, and the exact content of the base table 30 at the quiesce point is created in the target table 70. In this case, the copy generation function 60 can specify a single quiesce point and process the plurality of base tables 30 at the same time. While the copy generation function 60 is shown as a function independent of the DBMS 20 in the drawing, the copy generation function 60 may be an extension of a failure recovery function that the DBMS 20 has. In the embodiment, the copy generation function 60 is provided as an exemplary generation unit generating a new database and an exemplary determination unit determining, as a recovery start point, a checkpoint stored in association with backup data.

The target table 70 is an alternate table in which the content of the base table 30 at a quiesce point is stored. In this case, it is assumed that the target table 70 has the exactly the same table attributes as the base table 30. Specifically, it is assumed that column names, respective data types and lengths of individual columns, orders of the columns, and specifications of the respective sizes of the tables are the same. However, there is no problem even when indexes are not the same. In this case, this component is simply called the target table 70. Alternatively, the component may be viewed as storage means for storing the target table 70.

The outline of an operation of copying the base table 30 by the copy generation function 60 will next be described.

Figure 2:
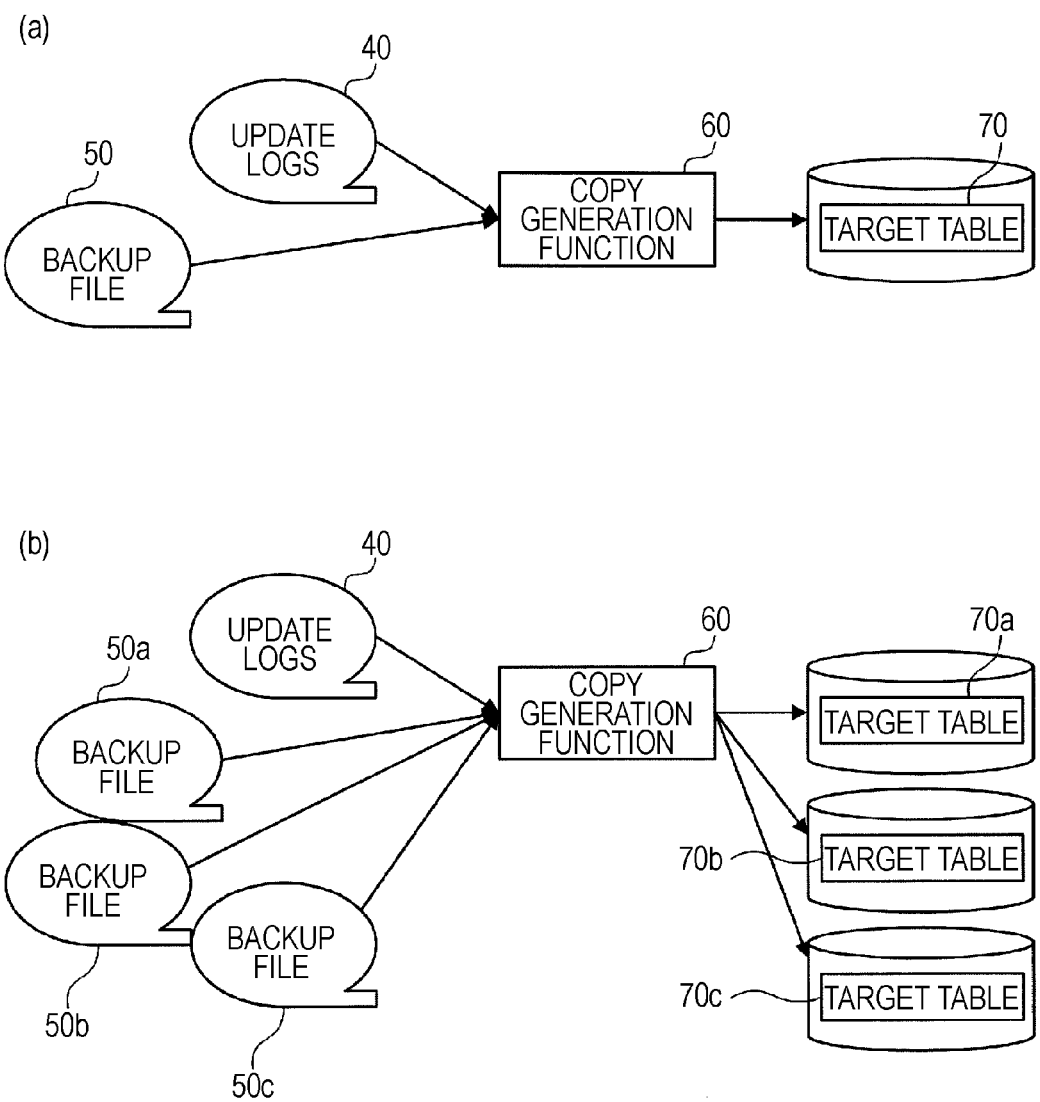
FIG. 2 is a diagram showing the outline of an operation according to the embodiment of the present invention.

FIG. 2 is a diagram schematically showing the outline of the operation of the copy generation function 60.

Part (a) is a diagram in a case where the target table 70 is generated by performing copying of the base table 30, as shown in FIG. 1.

In this case, the operation is started by, for example, a command extended from a failure recovery command, such as "RECOVER FROM TABLE1 TO TABLEX RESTORE <T1 FILE NAME>QUIESCEPOINT XXXXX". That is, the backup file 50 of the base table 30 is first restored into the target table 70. After the restore operation is completed, the target table 70 up to a quiesce point specified in "QUIESCE-POINT XXXXX" is restored by reading a log of the base table 30 from the update logs 40 and applying the log to the target table 70. In this case, although update data of a transaction that has been committed at the quiesce point is reflected, update data of, for example, a transaction across the quiesce point and a transaction that is performed after the quiesce point is not reflected. As the result, the target table 70 holding the content of the base table 30 at the quiesce point is created.

Part (b) is a diagram in a case where the plurality of target tables 70 are generated by performing copying of the plurality of base tables 30. The case is not shown in FIG. 1.

In this case, the operation is started by, for example, a command extended from a failure recovery command, such as "RECOVER FROM (TABLE1,TABLE2,TABLE3) TO (TABLEX,TABLEY,TABLEZ) RESTORE <T1 FILE NAME>, <T2 FILE NAME>, <T3 FILE NAME>QUIESCEPOINT XXXXX". That is, a backup file 50a of a base table 30a, a backup file 50b of a base table 30b, and a backup file 50c of a base table 30c are first restored respectively into target tables 70a, 70b, and 70c in parallel. After the restore operations are completed, the target tables 70 up to a quiesce point specified in "QUIESCEPOINT XXXXX" are restored by reading respective logs of the base tables 30a, 30b, and 30c from the update logs 40 and applying the logs to the target tables 70a, 70b, and 70c. In this case, the respective operations of restoring the backup files 50 can be performed in parallel, and the application operations can be performed by reading the update logs 40 only once. Thus, the time necessary to create the plurality of target tables 70 at the same quiesce point can be reduced.

In this case, the function of a recovery utility needs to be extended so as to create the target table 70, using the backup file 50 of the base table 30 and the update logs 40, as described above. Since a technique for recovering the data of the base table 30 on the basis of the backup file 50 and the update logs 40, specifying a quiesce point, has been already established, this extension can be implemented only by a functional extension in which this technique is applied to the target table 70 separate from the base table 30.

The operation of the copy generation function 60 according to the embodiment will next be described, using a specific example.

Figure 3:
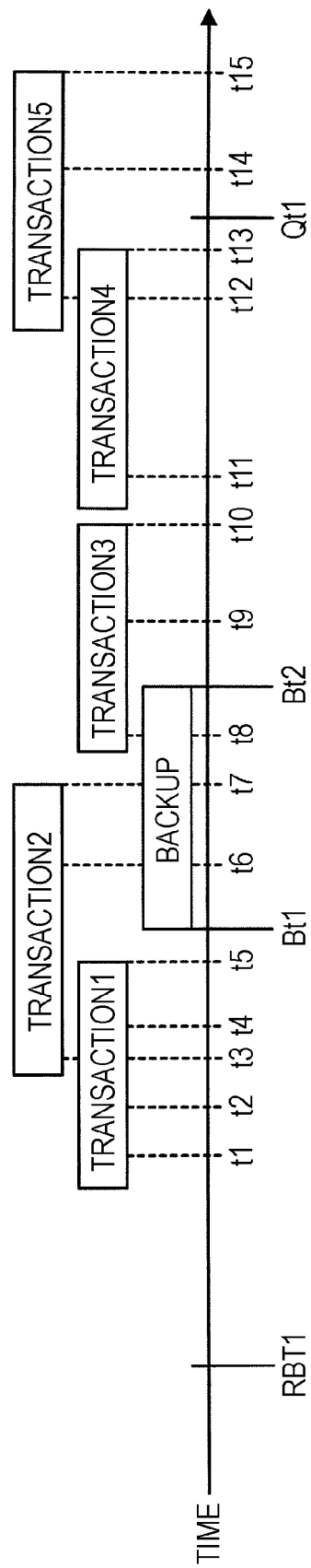
FIG. 3 is a diagram showing transactions, a backup operation, a recovery start point, and a quiesce point on the time axis.

FIG. 3 is a diagram showing transactions updating the base table 30, a backup operation for the base table 30, a recovery start point, and a quiesce point on the time axis.

After a recovery start point RBT1, transactions 1 to 4 are performed, as shown in the drawing. Subsequently, a transaction 5 is performed across a quiesce point Qt1. Furthermore, a backup operation is started while the transaction 2 is being performed and is completed while the transaction 3 is being performed. In this case, the recovery start point RBT1 is, for example, a system checkpoint and is held in system information in the DBMS 20 and the backup file 50.

FIG. 4 is a diagram showing a specific example of the update logs 40 recorded in the example in FIG. 3. In the drawing, the update logs 40 each include time, a corresponding transaction, a corresponding base table, a corresponding record ID, and corresponding update content placed in a line. A record ID is information indicating the location of a record in the base table 30 and is denoted by Rx. Hereinafter, a record, the record ID of which is Rx, is denoted as "record Rx". Moreover, in update content, the left side of an arrow indicates a value having not been updated, and the right side of the arrow indicates the value having been updated. The update logs 40 hold pieces of update data for the plurality of base tables 30. That is, the update logs 40 hold pieces of update data for the base tables 30b and 30c in addition to the base table 30a.

The update logs 40 will next be described briefly. The transaction 1 updates the base table 30 at times t1, t2, and t4 and performs a commit at time t5. The transaction 2 updates the base table 30 at times t3 and t6 and performs a commit at time t7. The transaction 3 updates the base table 30 at times t8 and t9 and performs a commit at time t10. The transaction 4 updates the base table 30 at time t11 and performs a commit at time t13. The transaction 5 updates the base table 30 at times t12 and t14 and performs a commit at time t15.

FIG. 5 is a diagram showing states of the base table 30a at points in time in a case where update operations as shown in the update logs 40 in FIG. 4 are performed.

Part (a) shows the content of the base table 30a at time before the time t1. The values of records R1, R2, R3, R4, R5, and R6 are "100", "200", "300", "400", "500", and "600", respectively.

Part (b) shows the content of the base table 30a at time after the time t5 and before the time t6. Referring to FIG. 4, the value of the record R3 is updated from "300" to "350" at the time t1, and the value of the record R5 is updated from "500"

to "450" at the time t4. Thus, the values of the records R1, R2, R3, R4, R5, and R6 are "100", "200", "350", "400", "450", and "600", respectively.

Part (c) shows the content of the base table 30a at time after the time t8 and before the time t9. Referring to FIG. 4, the value of the record R6 is updated from "600" to "650" at the time t6, and the value of the record R2 is updated from "200" to "250" at the time t8. Thus, the values of the records R1, R2, R3, R4, R5, and R6 are "100", "250", "350", "400", "450", and "650", respectively.

Part (d) shows the content of the base table 30a at time after the time t15. Referring to FIG. 4, the value of the record R3 is updated from "350" to "200" at the time t11, the value of the record R6 is updated from "650" to "700" at the time t12, and the value of the record R2 is updated from "250" to "300" at the time t14. Thus, the values of the records R1, R2, R3, R4, R5, and R6 are "100", "300", "200", "400", "450", and "700", respectively.

Part (e) shows the content of the base table 30a backed up between time Bt1 and time Bt2, i.e., the content of the backup file 50. The records R1 to R5 in the state of (b) and the record R6 in the state of (c) are held in the backup file 50, as shown by a broken line from (b) to (c), due to the order of the backup time and update time of each record. That is, for example, a value "250" having been updated, shown in (c), is not reflected in the backup file 50 as the value of the record R2, but a value "200" having not been updated, shown in (b), is reflected in the backup file 50 as the value of the record R2. In this manner, since the backup file 50 is created by online backup, the data of the backup file 50 is not necessarily backed up in a consistent state.

An operation in a case where the content of the base table 30a at the quiesce point Qt1 is restored into the target table 70 on the basis of the update logs 40 in FIG. 4 and the backup file 50 in FIG. 5(e) will next be described specifically.

The copy generation function 60 first restores the backup file 50 of the base table 30a into the target table 70.

Since the recovery start point is RBT1, and the quiesce point is Qt1 (t13<Qt1<t14), the copy generation function 60 uses a log for the base table 30a at time after RBT1 and before Qt1, out of the update logs 40.

FIG. 6 shows logs used by the copy generation function 60.

In this case, out of the log records for the times t1 to t15 in the update logs 40 in FIG. 4, the log records for the times t14 and t15 are ones for times after Qt1 and thus are excluded. Moreover, the log records for the times t2, t3, and t9 are not ones for the base table 30a and thus are excluded.

Such logs are applied to the target table 70.

Figure 7:
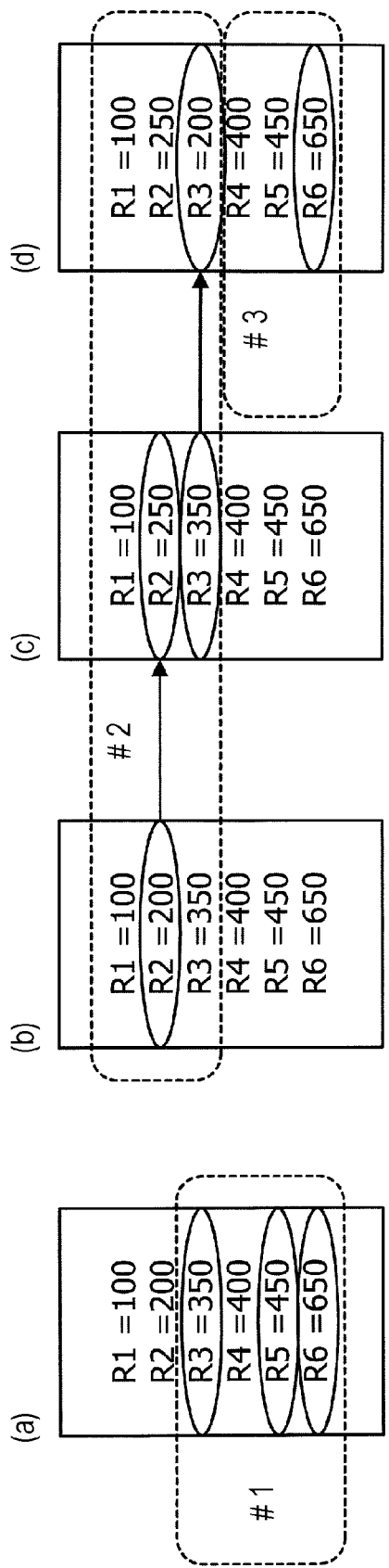
FIG. 7 is a diagram showing the transition of the content of a target table due to updating of the target table using update logs.

FIG. 7 is a diagram showing the transition of the content of the target table 70 when the logs are applied.

Part (a) shows the content of the target table 70 before the logs are applied. Updates in (1), (2), and (3) in FIG. 6 have been already reflected respectively in the records R3, R5, and R6 surrounded by ellipses in a broken line #1.

Parts (b), (c), and (d) show the content of the target table 70 when the logs are applied. An update in (4) in FIG. 6 is reflected in the record R2 surrounded by ellipses in a broken line #2, so that the value of the record R2 is updated from "200" in (b) to "250" in (c). Similarly, an update in (5) in FIG. 6 is reflected in the record R3 surrounded by ellipses in the broken line #2, so that the value of the record R3 is updated from "350" in (c) to "200" in (d). On the other hand, since commit information corresponding to an update in (6) in FIG. 6 is not included in FIG. 6, the update in (6) in FIG. 6 is not reflected in the record R6 surrounded by an ellipse in a broken line #3.

The copy generation function 60 implementing such an operation will next be described in details.

Figure 8:
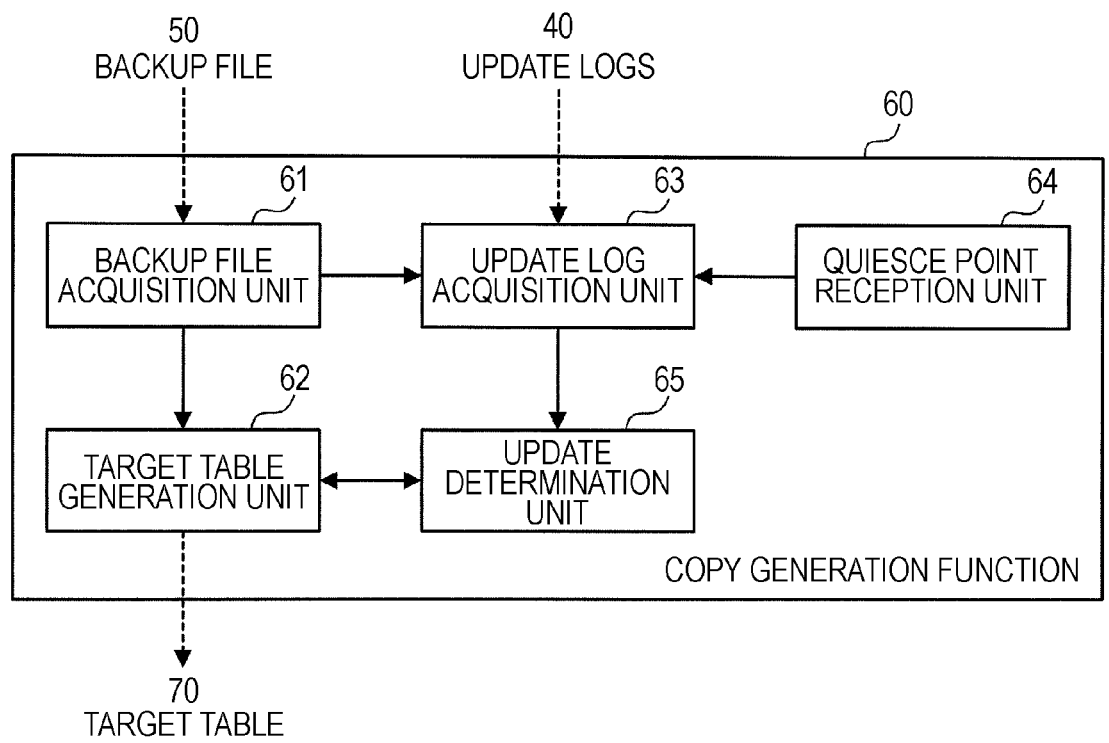
FIG. 8 is a block diagram showing exemplary components of a copy generation function according to the embodiment of the present invention.

FIG. 8 is a block diagram showing exemplary functional components of the copy generation function 60.

The copy generation function 60 includes a backup file acquisition unit 61, a target table generation unit 62, an update log acquisition unit 63, a quiesce point reception unit 64, and an update determination unit 65, as shown in the drawing.

The backup file acquisition unit 61 acquires the backup file 50 of the specified base table 30 from the backup files 50 output by the DBMS 20. At this time, the backup file acquisition unit 61 further acquires the recovery start point 51 associated with the backup file 50. In the embodiment, the backup file acquisition unit 61 is provided as an exemplary backup data acquisition unit acquiring backup data and an exemplary recovery start point acquisition unit acquiring a recovery start point stored in association with backup data.

The target table generation unit 62 generates the target table 70, in which a copy of the base table 30 at a quiesce point is stored, by restoring the backup file 50 acquired by the backup file acquisition unit 61 into the target table 70 and then applying, to the target table 70, a log record that the update determination unit 65 determines needs to be reflected in the target table 70. In the embodiment, the target table generation unit 62 is provided as an exemplary generation unit generating a new database.

The update log acquisition unit 63 acquires the update logs 40 output by the DBMS 20. In the embodiment, the update log acquisition unit 63 is provided as an exemplary update log acquisition unit acquiring an update log.

The quiesce point reception unit 64 accepts, for example, the information of a quiesce point specified by a user. In the embodiment, the quiesce point reception unit 64 is provided as an exemplary reception unit accepting specification of a specific point in time.

The update determination unit 65 determines whether each log record in the update logs 40 acquired by the update log acquisition unit 63 needs to be reflected in the target table 70.

Figure 9:
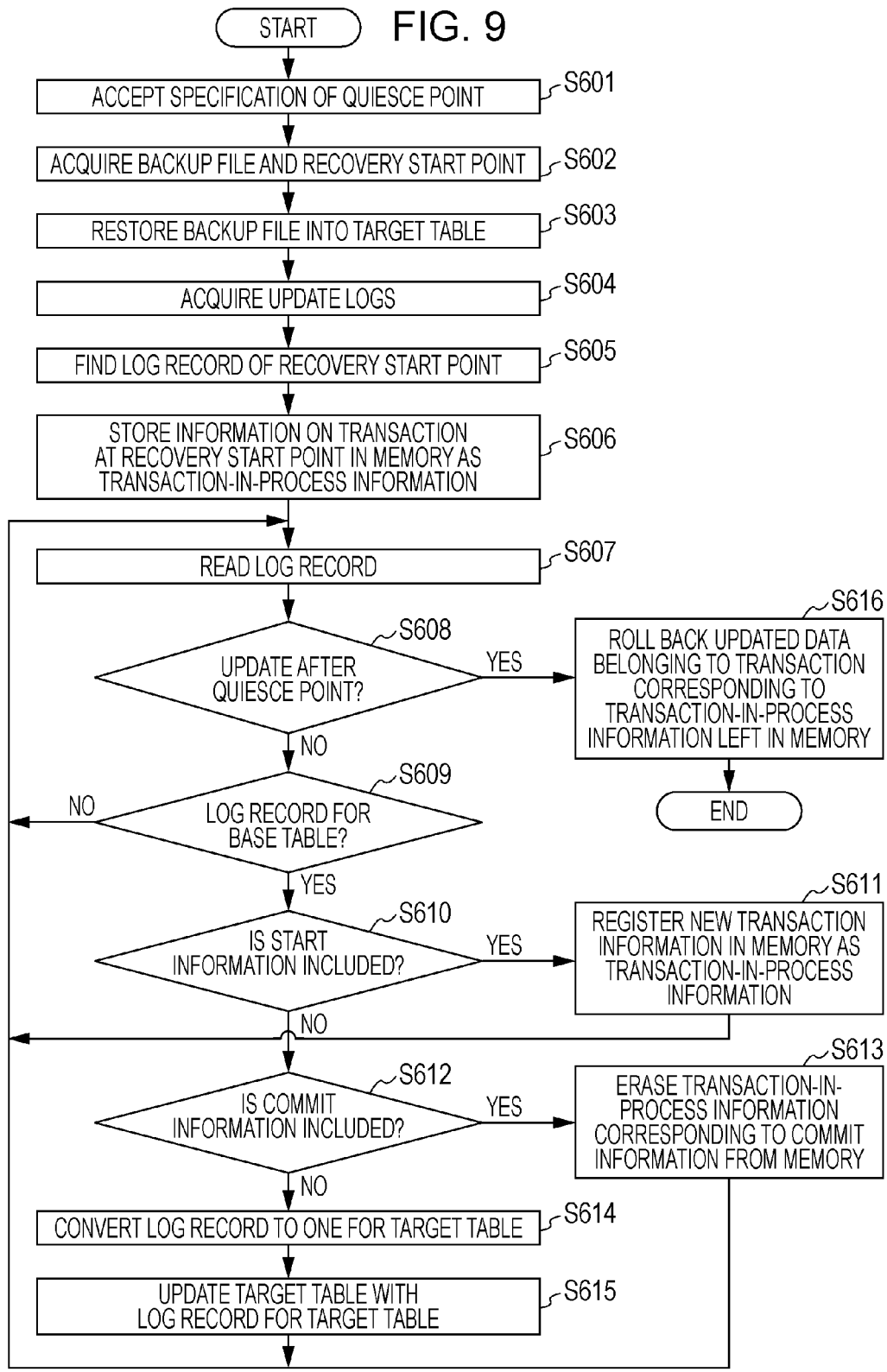
FIG. 9 is a flowchart showing an exemplary operation of the copy generation function according to the embodiment of the present invention.

FIG. 9 is a flowchart showing an exemplary operation of the copy generation function 60.

In the copy generation function 60, the quiesce point reception unit 64 first accepts specification of a quiesce point by, for example, a user (S601).

Then, the backup file acquisition unit 61 acquires the backup file 50 of the specified base table 30, out of the backup files 50 output by the DBMS 20, and the recovery start point 51 associated with the backup file 50 (S602). Then, the target table generation unit 62 restores the backup file 50 into the target table 70 (S603).

Furthermore, the update log acquisition unit 63 acquires the update logs 40 output by the DBMS 20 (S604).

When the backup file 50 has been restored into the target table 70, and the update logs 40 have been acquired, as described above, the update determination unit 65 determines whether to use each log record in the update logs 40 to update the target table 70, and the target table 70 is updated, using log records that the update determination unit 65 determines are used to update the target table 70.

That is, the update determination unit 65 first finds a log record of the recovery start point 51 (S605). In this case, the recovery start point 51 acquired, together with the backup file 50, by the backup file acquisition unit 61 in S602 is used as the recovery start point 51. Then, information on a transaction that was being performed at the recovery start point (hereinafter called transaction information) is read from the log record and is then stored in a memory as transaction-in-process information (S606).

Then, the update determination unit 65 reads a log record from the acquired update logs 40 (S607). Then, the update determination unit 65 determines whether an update operation in the log record was performed after the quiesce point (S608). Specifically, the update determination unit 65 determines whether the time stamp of the log record is newer than the time stamp of the quiesce point. In this case, the quiesce point accepted by the quiesce point reception unit 64 in S601 is used as the quiesce point.

When the update determination unit 65 determines that the update operation in the log record was not performed after the quiesce point, i.e., the time stamp of the log record is not newer than the time stamp of the quiesce point, the update determination unit 65 determines whether the log record is one regarding an update of the base table 30 (S609).

As the result, when the update determination unit 65 determines that the log record is not one regarding an update of the base table 30, the process returns to S607.

On the other hand, when the update determination unit 65 determines that the log record is one regarding an update of the base table 30, the update determination unit 65 determines whether the log record includes transaction start information (hereinafter simply called start information) (S610). When the update determination unit 65 determines that the log record includes start information, new transaction information is stored in the memory as transaction-in-process information (S611), and then the process returns to S607. On the other hand, when the update determination unit 65 determines that the log record does not include start information, the process proceeds to S612.

The update determination unit 65 determines whether the log record includes commit information (S612). When the update determination unit 65 determines that the log record includes commit information, transaction-in-process information corresponding to the commit information is erased from the memory (S613), and then the process returns to S607. On the other hand, when the update determination unit 65 determines that the log record does not include commit information, the process proceeds to an operation of updating the target table 70.

That is, a log record that is determined in S608 as not relating to an update after the quiesce point, is determined in S609 as relating to an update of the base table 30, is determined in S610 as not including start information, and is determined in S612 as not including commit information in this manner is one holding update data to be reflected in the target table 70. Thus, the update determination unit 65 converts the log record for the base table 30 to a log record for the target table 70 (S614) and updates the target table 70 with the log record having been converted (S615). Then, the process returns to S607. Subsequently, a similar operation is repeated on a log record read in S607 until an update operation in the log record is one performed after the quiesce point in S608. When it is determined in S608 that an update operation in the log record is one performed after the quiesce point, i.e., the time stamp of the log record is newer than the time stamp of the quiesce point, updated data belonging to a transaction corresponding to transaction-in-process information left in the memory is rolled back (S616).

The exemplary operation of the copy generation function 60 in the flowchart in FIG. 9 will next be described, taking, as examples, cases where the log records in FIG. 6 are read in S607 and update operations as shown in FIG. 7 are performed. Regarding cases where the log records for the times t5, t7, t10, and t13 are read, the log records are commit information, resulting in "Yes" in S612, and thus are not determined as being ones to be used for update operations. Thus, the description is omitted.

A case where a log record (1) in FIG. 6 is read will first be described. Regarding the log record (1), it is assumed that it is determined by reading the log record (1) in S607 that RBT1<t1. Then, it is determined in S608 that t1≤Qt1, it is determined in S609 that the log record (1) is one for the base table 30a, it is determined in S610 that the log record (1) does not include start information, and it is determined in S612 that the log record (1) does not include commit information. Thus, the copy generation function 60 attempts to update the value of the record R3 in the target table 70 according to the log record (1). However, the record R3 has been updated and thus will not be actually updated.

A case where a log record (2) in FIG. 6 is read will next be described. Regarding the log record (2), it is assumed that it is determined by reading the log record (2) in S607 that RBT1<t4. Then, it is determined in S608 that t4≤Qt1, it is determined in S609 that the log record (2) is one for the base table 30a, it is determined in S610 that the log record (2) does not include start information, and it is determined in S612 that the log record (2) does not include commit information. Thus, the copy generation function 60 attempts to update the value of the record R5 in the target table 70 according to the log record (2). However, the record R5 has been updated and thus will not be actually updated.

A case where a log record (3) in FIG. 6 is read will next be described. Regarding the log record (3), it is assumed that it is determined by reading the log record (3) in S607 that RBT1<t6. Then, it is determined in S608 that t6≤Qt1, it is determined in S609 that the log record (3) is one for the base table 30a, it is determined in S610 that the log record (3) does not include start information, and it is determined in S612 that the log record (3) does not include commit information. Thus, the copy generation function 60 attempts to update the value of the record R6 in the target table 70 according to the log record (3). However, the record R6 has been updated and thus will not be actually updated.

These operations are those for records surrounded by ellipses in the broken line #1 in FIG. 7.

A case where a log record (4) in FIG. 6 is read will next be described. Regarding the log record (4), it is assumed that it is determined by reading the log record (4) in S607 that RBT1<t8. Then, it is determined in S608 that t8≤Qt1, it is determined in S609 that the log record (4) is one for the base table 30a, it is determined in S610 that the log record (4) does not include start information, and it is determined in S612 that the log record (4) does not include commit information. Thus, the copy generation function 60 updates the value of the record R2 in the target table 70 from "200" to "250" according to the log record (4).

A case where a log record (5) in FIG. 6 is read will next be described. Regarding the log record (5), it is assumed that it is determined by reading the log record (5) in S607 that RBT1<t11. Then, it is determined in S608 that t11≤Qt1, it is determined in S609 that the log record (5) is one for the base table 30a, it is determined in S610 that the log record (5) does not include start information, and it is determined in S612 that the log record (5) does not include commit information. Thus, the copy generation function 60 updates the value of the record R3 in the target table 70 from "350" to "200" according to the log record (5).

These operations are those for records surrounded by ellipses in the broken line #2 in FIG. 7.

A case where a log record (6) in FIG. 6 is read will next be described. Regarding the log record (6), it is assumed that it is determined by reading the log record (6) in S607 that RBT1<t12. Then, it is determined in S608 that t12≤Qt1, it is determined in S609 that the log record (6) is one for the base table 30a, it is determined in S610 that the log record (6) does not include start information, and it is determined in S612 that the log record (6) does not include commit information. Thus, the copy generation function 60 updates the value of the record R6 in the target table 70 from "650" to "700" according to the log record (6). However, at a point in time when determination is "Yes" in S608, the transaction information of a transaction having output the log record (6) resides in the memory. Thus, in S616, a rollback operation is performed for this update, so that the value of the record R6 is set back to "650".

This operation is that for a record surrounded by an ellipse in the broken line #3 in FIG. 7.

The embodiment of the present invention has been described.

In the embodiment, a copy of a database at a quiesce point is created into the target table 70, which is an alternate table, on the basis of an online backup of the base table 30 and the update logs 40, as described above. This enables simple creation of the content of a database (continuously changing due to updates) at a quiesce point in an alternate table.

Moreover, in the embodiment, since creation of the target table 70 does not affect an operation of updating the base table 30 at all, the base table 30 can be caused to operate continuously.

Moreover, in the embodiment, even in the case of the large base table 30 of, for example, several hundred gigabytes, the time necessary to create a copy of the base table 30 can be reduced, and necessary CPU utilization and disk amount can be reduced.

Moreover, in the embodiment, respective copies including the content of the plurality of base tables 30 at the same quiesce point can be created.

The following product improvements need to be made to incorporate the embodiment in a product.

A first improvement is one for enabling the backup file 50 of the base table 30 and the update logs 40 to be used to restore a table separate from the base table 30. For example, when a limitation is set so that the DBMS 20 cannot be used for the alternate table, the limitation needs to be removed. Then, a function of performing a conversion of the update logs 40 of the base table 30 so as to apply the update logs 40 to the target table 70, with the information of the update logs 40 being kept, needs to be added.

Moreover, a product preferably includes the following functions.

A first function is one of enabling specification of a quiesce point by a time stamp for a simple operation.

A second function is one of checking that the base table 30 has the same attributes as the target table 70.

Figure 10:
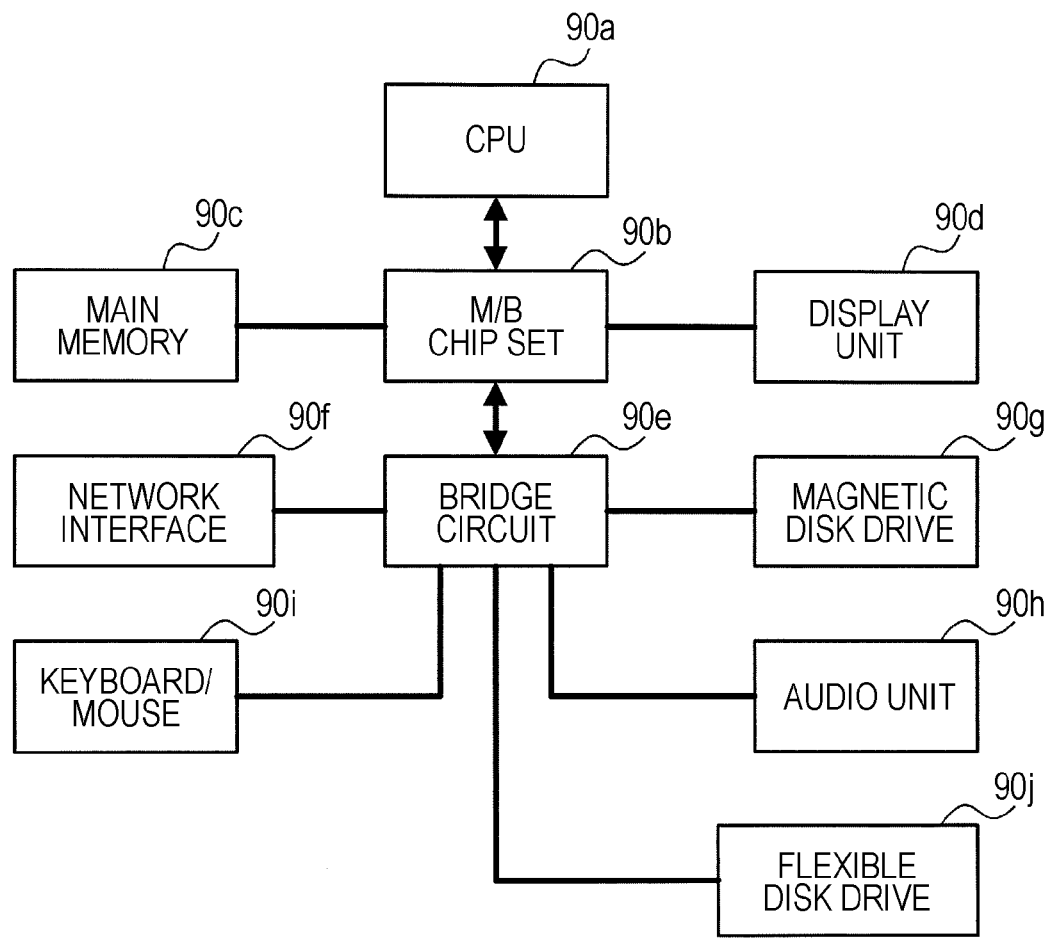
FIG. 10 is a diagram showing the hardware configuration of a computer to which the embodiment of the present invention is applicable.

Finally, a hardware configuration of a computer to which the embodiment is suitably applied will be described. FIG. 10 is a diagram showing an exemplary hardware configuration of such a computer. The computer includes a central processing unit (CPU) 90a that is a calculation means, a main memory 90c connected to the CPU 90a via a mother board (M/B) chip set 90b, and a display unit 90d connected to the CPU 90a via the M/B chip set 90b, as shown in the drawing. Moreover, a network interface 90f, a magnetic disk drive (HDD) 90g, an audio unit 90h, a keyboard/mouse 90i, and a flexible disk drive 90j are connected to the M/B chip set 90b via a bridge circuit 90e.

In FIG. 10, the individual components are connected to each other via a bus. For example, connection between the CPU 90a and the M/B chip set 90b and connection between the M/B chip set 90b and the main memory 90c are established via a CPU bus. Moreover, connection between the M/B chip set 90b and the display unit 90d may be established via Accelerated Graphics Port (AGP). However, when the display unit 90d includes a video card that supports PCI Express, connection between the M/B chip set 90b and this video card is established via a PCI Express (PCIe) bus. Moreover, when connection to the bridge circuit 90e is established, regarding the network interface 90f, for example, PCI Express may be used. Moreover, regarding the magnetic disk drive 90g, for example, serial AT Attachment (ATA), ATA for parallel transfer, or Peripheral Components Interconnect (PCI) may be used. Moreover, regarding the keyboard/mouse 90i and the flexible disk drive 90j, Universal Serial Bus (USB) may be used.

The present invention may be implemented entirely via hardware, or entirely via software. Alternatively, the present invention may be implemented via both hardware and software. Moreover, the present invention may be implemented as a computer, a data processing system, or a computer program. This computer program can be stored and provided in a computer-readable storage medium. In this case, an electronic, magnetic, optical, electromagnetic, infrared, or semiconductor system (apparatus or device) may be considered as the medium. Moreover, a semiconductor or solid-state storage unit, a magnetic tape, a detachable computer diskette, a random access memory (RAM), a read only memory (ROM), a rigid magnetic disk, and an optical disk can be shown as an example of a computer-readable storage medium. Examples of current optical disks include a compact disk-read only memory (CD-ROM), a compact disk-read/write (CD-R/W), and a DVD.

While the present invention has been described using the embodiment, the technical scope of the present invention is not limited to the aforementioned embodiment. It is obvious to persons skilled in the art that various changes can be made or an alternative embodiment can be adopted without departing from the spirit and scope of the present invention.

The invention claimed is:

1. A device for generating a copy of an original database at a specific quiesce point in time, comprising:
  a recovery start point stored with the original database;
  a backup data acquisition unit for acquiring backup data of the original database output by a database management system (DBMS), before the specific point in time for use in recovering the original database, without stopping updating of the original database and while continuously operating the original database, wherein the backup data and a copy of the recovery start point are stored together in memory;
  an update log acquisition unit for acquiring update logs of the original database recorded during a period between the recovery start point before a time period and the specific point in time, the DBMS having output the backup data during the time period for use in recovering the original database; and
  a generation unit for generating, as the copy, a new database holding content of the original database at the specific point in time on a basis of the backup data acquired by the backup data acquisition unit and the update logs acquired by the update log acquisition unit, wherein the generation unit generates the new database by updating the backup data acquired by the backup data acquisition unit with update logs, acquired by the update log acquisition unit, relating to transactions committed before the specific point in time and to updates having not been reflected in the backup data.

2. The device according to claim 1, further comprising a reception unit for accepting specification of the specific point in time by a user.

3. The device according to claim 1, further comprising a recovery start point acquisition unit for acquiring the copy of the recovery start point stored in association with the backup data acquired by the backup data acquisition unit.

4. A device for generating a copy of an original database at a specific quiesce point in time, comprising:
   a recovery start point stored with the original database;
   a database management system (DBMS) including at least an output function for outputting backup data of the original database, temporarily stored in memory with a copy of the recovery start point, for use in recovering the original database without stopping updating of the original database and while continuously operating the original database, and a recording function for recording update logs of the original database for use in recovering the original database; and
   a generation unit for generating, as the copy, a new database holding content of the original database at the specific point in time on a basis of the backup data output by the output function of the DBMS before the specific point in time and the update logs recorded by the recording function of the DBMS during a period between the recovery start point before a time period and the specific point in time, the backup data having been output during the time period, wherein the generation unit generates the new database by updating the backup data with the update logs relating to transactions committed before the specific point in time and to updates having not been reflected in the backup data.

5. The device according to claim 4, further comprising:
   a storage unit for storing a checkpoint before the time period, during which the backup data have been output, in association with the backup data output by the output function of the DBMS; and
   a determination unit for determining, as the recovery start point, the checkpoint stored in the storage unit in association with the backup data.

6. A device for generating a copy of an original database at a quiesce specific point in time, comprising:
   a recovery start point stored with the original database;
   a database management system (DBMS) including at least an output function for outputting backup data of the original database temporarily stored in memory with a copy of the recovery start point for use in recovering the original database without stopping updating of the original database and while continuously operating the original database, and a recording function for recording update logs of the original database for use in recovering the original database;
   a backup data acquisition unit for acquiring the backup data output by the output function of the DBMS before the specific point in time;
   an update log acquisition unit for acquiring the update logs recorded by the recording function of the DBMS during a period between the recovery start point before a time period and the specific point in time, the backup data having been output during the time period; and
   a generation unit for generating, as the copy, a new database holding content of the original database at the specific point in time by updating the backup data acquired by the backup data acquisition unit with update logs, acquired by the update log acquisition unit, relating to transactions committed before the specific point in time and relating to updates having not been reflected in the backup data.

* * * * *